United States Patent Office 3,269,677
Patented August 30, 1966

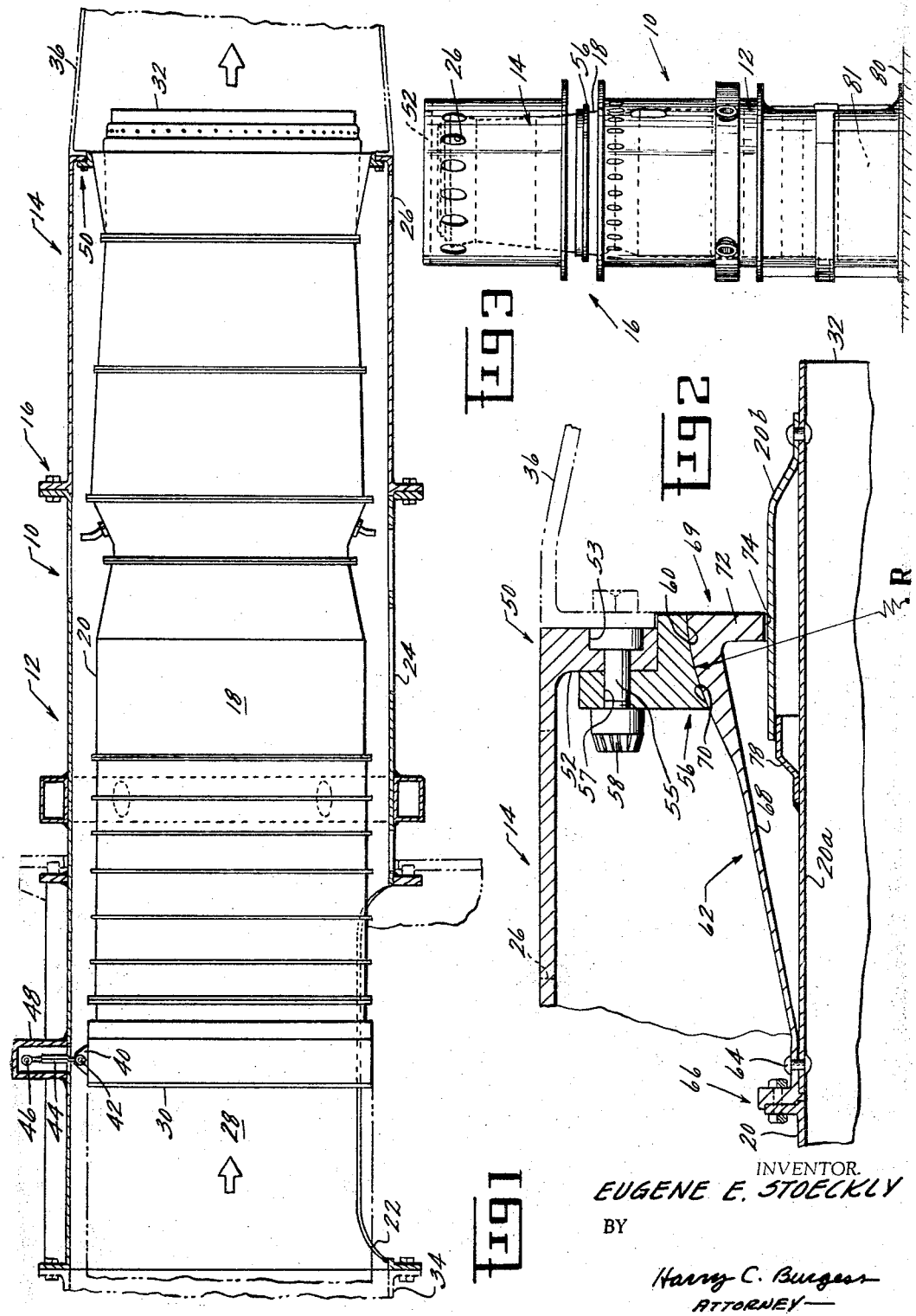

3,269,677
SELF-ALIGNING MOUNTING STRUCTURE
Eugene E. Stoeckly, Cincinnati, Ohio, assignor to General
 Electric Company, a corporation of New York
Filed Dec. 30, 1963, Ser. No. 334,179
5 Claims. (Cl. 248—2)

This invention relates generally to a mounting structure, and more particularly, to a self-aligning mounting structure for use with a gas generator constructed of relatively lightweight materials and suitable for aircraft installation.

As is well known, a gas turbine is a device in which air is compressed in a rotating compressor, heated in a combustion chamber, and expanded in a turbine. The power output of the turbine is utilized to drive the compressor and any load mechanically connected to the drive, or aerodynamically coupled ot the turbine. Examples of gas turbines particularly suited for aircraft installation include: (1) a turbojet, wherein no excess power (other than that required to drive the compressor) is supplied by the turbine; (2) a turboprop, wherein the turbine is mechanically connected so as to provide excess power to drive a load (i.e., a propeller); and (3) a turbofan, wherein in the case of an aft-fan, for example, the gas generator supplies excess power to drive an aerodynamically-coupled or free-floating turbine which, in turn, drives an integral low-pressure compressor (fan).

Recently, gas turbomachines or gas generators constructed of lightweight materials and originally designed for aircraft usage—where weight is critical—have been suggested for use in non-airborne or ground applications. For example, in the utility and industrial fields, one or more lightweight aircraft-type gas generators may be arranged to drive an aerodynamically-coupled load turbine. The load turbine, in turn, may be utilized to generate power in the form of electricity for use, for example, during peak power requirement periods in the case of utility applications. It has been found advantageous, in such instances, to mount the gas generator or engine in a separate container or tube for a number of reasons including, ease of installation or removal in the event of needed repairs to, or replacement of the engine, physical protection of the lightweight, aircraft-type engine, and use of the container as a physical dividing point between aircraft-type construction, fittings, hoses, etc., and industrial or utility type construction, fittings, hoses, etc. In this latter connection, it should be pointed out that, while the rugged engine containing tube can easily be installed in, or removed from the main power generating system by men having the skills normally found in utility or industrial powerplants, namely those generally acquainted with the handling of massive heavy duty equipment, direct handling of the relatively lightweight aircraft-type engine, its parts and components, is preferably done only by those normally skilled in such arts. Since the latter skills are not usually found in utility powerplants it is advantageous to have an arrangement whereby the tube, or container with an installed engine can be sent—as a unit—to a shop skilled in aircraft-type maintenance and repairs. In addition, the container or tube can be utilized as a cooling air shroud for ducting cooling air around the engine, while also serving as a mounting structure for premounting and connecting the gas generator, with all of its accessories, in readiness for mounting to the main powerplant structure.

However, as is the case with most lightweight aircraft-type construction, the outer engine casing structures are relatively flexible in comparison to the heavier, rigid, typically massive utility or industrial type casing designs. Consequently, when such a flexible lightweight aircraft-type engine structure with a gas tight exhaust connection is mounted by conventional means inside a strong and massive protective tube, all the normally consequent alignment and concentricity errors will result in *major* deflections of the flexible aircraft engine components and only *minor* deflections in the massive enclosing tube. These alignment and concentricity errors are the normal result of such factors as inaccuracies in manufacture, assembly and handling damage, warpage during and after manufacturing, stress relieving, unequal thermal growth during operation, warpage with age and use, improper assembly, and the like. In the typical axial-flow aircraft gas turbine, moreover, the tolerances between the rotating parts, i.e., the compressor blades and turbine bucket tips, and the static parts, such as the inner surfaces of the compressor and turbine casings, are kept quite small for maximum efficiency of operation. Thus, any undue deflection imposed on the aircraft engine casing could cause rubbing between the rotating and stationary parts sufficient to severely damage or even ultimately destroy the engine.

It should also be pointed out that the conventional system for mounting aircraft-type, i.e., turbojet engines, typically uses at the center or towards the rear of the engine casing one or more ball-shaped, universal-type bearing mounts on radial centerlines, in conjunction with a forward clevis turnbuckle-type hanger adapted to transmit a combination of gas reaction, and other dynamic and static reaction forces between the engine casing and the aircraft supporting structure. An example of such an arrangement is shown in the patent to Pirtle et al., 3,042,-349, of common assignment. However, in a non-airborne utility or industrial application, such as herein envisioned, the latter arrangement would likely produce damaging deflections and stresses due to imposed deflections and gas pressure loadings not present in aircraft applications. For example, in an aircraft installation the engine exhaust nozzle is connected directly to and moves with the gas generator. Thus, the very high internal gas pressure forces may be balanced out, except for the forces resulting from the net change in gas momentum from the inlet to exhaust. In addition to this reduction in gas forces, the aircraft application has no deflections and stresses resulting strictly from alignment of the exhaust connection, since in such cases the exhaust connection moves freely with the engine. In the utility and industrial application, on the other hand, the effects of exhaust connection misalignment and concentricity error may be reduced by the use of flexible bellows-type connections. However, because of the increased outer diameter of the bellows over the internal flow diameter of the engine, there is a resultant increase in the already very high internal gas pressure forces that the engine mounts must transmit to the supporting tube. Such high loadings, the major portion of which must be transmitted solely through the one or two engine mounts, puts high concentrated loads and deflections on localized portions of the engine frame.

Accordingly, a general object of the present invention is to provide an improved mounting structure or arrangement for a lightweight aircraft-type gas generator adapted for non-airborne utility or industrial applications.

A more specific object of the invention is to provide a continuously self-adjusting or self-aligning mounting structure that provides both support for a lightweight aircraft-type gas generator, i.e., against radial and axial loads, and a gas tight exhaust connection of the gas generator to the mounting structure, without introducing into the gas generator casing any damaging stresses or deflections resulting from misalignment, non-concentricity, differential thermal expansion, or similar causes, either from inaccuracies in the manufacture of component parts or lack of skill in assembly and alignment.

Briefly, in the disclosed embodiment the invention comprises, in combination, a rigid outer supporting container or tube having radially adjustable hanger-type means connected to the forward portion of the relatively flexible, lightweight outer casing of an aircraft-type gas generator or engine for vertical and horizontal support thereof and a self-aligning, self-adjusting spherical bearing-flange mounting assembly for support of the engine at its rearward or exhaust end, the bearing-flange mounting assembly minimizing or eliminating vertical and horizontal support and twisting moments which could otherwise be imposed on the gas generator casing by reason of its installation in the container or tube, providing a gas-tight exhaust connection, and transmitting internal gas pressure forces uniformly circumferentially between the gas generator casing and the container or tube.

While the advantages and benefits to be gained from the invention are believed to be clearly and distinctly pointed out by the claims appended hereto, the invention may perhaps become better understood with reference to the following details description, including drawings of which:

FIG. 1 is a partial cross-sectional side view of a typical axial-flow, multi-stage, lightweight aircraft-type gas generator (turbojet engine) installed in a container using my invention and adapted for use in an industrial or utility power application;

FIG. 2 is an enlarged partial cross-sectional view of the novel spherical bearing-flange mounting arrangement of the subject invention; and FIG. 3 is a view of a partial assembly of the engine and container of FIG. 1.

Turning now more specifically to the drawings, numeral 10 indicates generally the gas generator container (or tube). While only one container is shown, it is understood that several containers and gas generators may be employed, depending on the application, in a single installation for driving, in combination, a single relatively large aerodynamically-coupled load turbine. The container 10 indicated herein comprises a forward tube section 12 and an aft tube section 14. The tube sections are generally cylindrical and are connected together to form an integral container by suitable fastening means, such as the mating flanges and bolts indicated generally at 16. The gas generator, in this instance, a lightweight turbojet-type aircraft engine, is indicated generally at 18. The engine has a relatively flexible, lightweight (thin) outer casing 20, but will not be otherwise further described since its internal cycle arrangement is unimportant to the teachings of this invention. The container 10 completely encloses the engine, except for several openings, such as holes 22, 24 and 26 provided, for example, for access to engine mounted control, accessory, or other connections. Air (indicated by the large arrows in FIG. 1) enters the inlet end of the container at 28, is ingested by the engine compressor at the compressor inlet 30, goes through the typical turbojet cycle described hereinabove, and is exhausted at the engine outlet end or nozzle, indicated at 32. Connected at either end of the container 10 are suitable inlet and exhaust ducts (dotted lines) 34 and 36, respectively, leading to an inlet bellmouth and to a load turbine inlet nozzle (neither shown), also respectively.

Turning now to specific features of my invention, the engine 18 is adapted to be supported in the container 10 by adjustable mounting means located at the forward or inlet end thereof, including at least one clevis 40 firmly affixed to the outer casing 20 of the engine. Pivotally attached at one end at 42 to the clevis is a hanger or turnbuckle 44, the other end of which is pivotally supported from a mounting structure or hat section 48 on the container, as at 46.

As pointed out, in a non-airborne application the conventional aircraft engine mounting arrangement is undesirable, besides being unnecessary and expensive. Hence, one of the features of my invention is to eliminate the concentrated loading points on the engine casing which would otherwise be present, and to automatically and continuously compensate for all alignment and concentricity errors by the use of my novel spherical bearing-flange mounting arrangement, indicated generally at 50, that acts both as a flexible gas seal, engine support, and as means for distributing the internal gas pressure loads uniformly circumferentially back to the engine casing. Referring specifically to FIG. 2, the aft tube section 14 is provided with an integral inturned or radial flange portion 52 containing a plurality of circumferentially spaced counterbored bolt holes 53. Adapted to be securely fastened to the flange 52 by means of bolts 55 fitted in the counterbored holes 53 is a mounting flange or seating ring, generally indicated at 56. The bolts 55 are adapted to extend through holes 57 in the mounting flange or ring aligned with the holes 53, the bolts being secured by nuts 58. At the radially inner face of the mounting ring 56 there is provided a generally spherical inwardly-facing seating surface 60. The surface 60 is on a relatively large diameter having a radius "R." Additionally, there is provided a bearing means comprising a large generally frusto-conical shaped member indicated generally at 62. The frusto-conical shaped member 62 is adapted to be rigidly affixed to the engine casing 20 upstream of the exhaust outlet 32 by suitable fastening means, such as rivets 64. Preferably, and as shown, there is provided a lightweight rearward casing extension piece 20a utilized to extend the gas generator flow path and as a heat shield in combination with annular piece 20b. Member 62 may be riveted to piece 20a using fasteners 64, the assembled pieces being in turn rigidly connected to the casing by the bolted flange arrangement indicated generally at 66. The frusto-conical member 62 includes a relatively thin body portion 68 extending rearwardly at a divergent angle with the casing portion 20a. At the rearwardmost extremity of the body portion is a thickened flange portion, generally indicated at 69. The flange has a generally spherical outwardly-facing seating surface 70 on a radius substantially equal, i.e., very slightly smaller than the radius R of seating surface 60. The flange 69 also includes an inner extension 72 having a surface 74 adapted to be in substantial abutment with member 20b. A stiffener 78 for members 20a and 20b may also be provided.

In assembling an engine 18 in a container 10 the following procedure may be utilized. As shown in FIG. 3, a ground stand or mounting platform, indicated at 80, is provided upon which is placed—in a vertical position—the forward tube section 12. The engine is then lowered, by means of a crane or other ground-handling equipment (not shown), onto a support or billet 81 positioned inside the tube. While the engine is then supported, the frusto-conical member 62 and the seal 20b are attached to the casing 20, although these parts of the novel bearing-flange mount may be pre-assembled with the gas generator. In the case of pre-assembly, the seating-ring 56 will have been previously placed around the engine casing. The aft tube section is then dropped in place, the ring 56 raised adjacent to flange portion 52, and several of the bolts 55 loosely engaged with the nuts 58. The forward and aft assemblies are then mated, that is, the ring 56 and aft section 14 (shown partially assembled in the drawing) are moved into juxtaposition, with the flange and bolt connection 16 very loosely engaged and the spherical mating surfaces 60 and 70 on the seating ring 56 and frusto-conical member 62, respectively, in opposition. Then, the remaining bolts 55 and nuts 58 are threadably engaged, through the access holes 26, and the spherical surfaces 60, 70 brought into close abutment. It is to be noted that the center point of the radius R is located rearwardly of the radial plane of the rearward faces of flange 72 and ring 56 to facilitate mating of the substantially equally spherical portions 60 and 70. With the engine standing perfectly vertical as bolts 55 are tightened, the concentric spherical surfaces come together in a manner such as to provide a self-aligning, stress-free, yet rigid restraint and supporting arrangement at the rear of the engine. That is, the surfaces 60–70 come together with little or no twisting, bending, or other deformation stresses induced in the relatively thin, lightweight casing member 20. The bolted flange connection between the forward and aft tube section may then be completely secured. Finally, the turnbuckles 44 are installed, tightened just enough to remove any play therein and the engine-container assembly positioned horizontally, as shown in FIG. 1. Any necessary centering of the engine at the forward or inlet end of the container may now be accomplished by slight adjustment of turnbuckle 44, two of which are usually provided, spaced 90° apart.

It is intended that any changes or modifications to the invention as are within the skill of the art are to be covered by the claims appended hereto.

What I claim as new and desire to protect by Letters Patent is:

1. A support structure for a lightweight gas turbine engine, said structure comprising, in combination:
  a generally cylindrical, rigid container having an inlet end and an outlet end;
  adjustable engine support means adjacent said container inlet end;
  and a self-aligning engine mounting assembly adjacent said container outlet end, said mounting assembly including a radially-extending flange, a first annular member supported by said flange, and a second annular member adapted for support by the said engine, said first and second annular members having opposed, matching spherically-curved seating surfaces in abutment to permit universal relative movement between said annular members of said assembly to minimize undue support-induced stress concentrations in said lightweight gas turbine engine when supported thereby.

2. A support structure for a lightweight gas turbine engine, said structure comprising, in combination:
  a generally cylindrical, rigid container having an inlet end and an outlet end;
  adjustable engine support means adjacent said container inlet end;
  and a self-aligning engine mounting assembly adjacent said container outlet end, said mounting assembly including a radially-extending flange on said container, a ring member, fastener means securing said ring member to said flange, and a generally frusto-conical member adapted to be secured at one end thereof to the engine, said ring member and said frusto-conical member each having a spherically-shaped seating surface thereon, said surfaces being projected on substantially equal radii mating in abutment, said surfaces being universally relatively movable for controlled positioning of said engine in said container to minimize unwanted support-induced stress concentrations in said lightweight gas turbine engine when supported thereby.

3. A support structure for a lightweight gas turbine engine, said structure comprising, in combination:
  a generally cylindrical, rigid container having an inlet end and an outlet end;
  adjustable engine support means adjacent the container inlet end;
  and a self-aligning engine mounting assembly adjacent said container outlet end, said engine mounting assembly including, a radially-extending flange at the outlet end of said container and integral therewith, a flanged ring member generally L-shaped in cross-section fastened by one arm thereof to said radially-extending flange, the other arm thereof having a first annular seating surface thereon facing inwardly of said container, a generally frusto-conical member, and means for securely attaching said frusto-conical member at one end thereof to said engine, said frusto-conical member including a thin body portion flaring outwardly rearwardly of said one end thereof and a thickened flange portion at its rearwardmost extremity, said thickened flange portion having a second annular seating surface thereon facing outwardly of said container, said inwardly and outwardly facing seating surfaces having concentric spherical curvatures, said surfaces being in abutment and being universally relatively movable for positioning of said engine in said container so as to minimize unwanted support-induced stress concentrations in said lightweight gas turbine engine when supported thereby.

4. A support structure for an aircraft-type gas turbine engine having a lightweight, relatively flexible outer casing and adapted for use in a non-airborne power generation system, said support structure comprising, in combination:
  a generally cylindrical, elongated metal container having an open inlet end and an open outlet end, said container having means providing rigidity thereto including a plurality of hat sections and a plurality of radially-extending flanges;
  radially adjustable support means located adjacent the container inlet end and pivotally connected to one of said hat sections for attaching said engine casing to said container;
  and a self-aligning engine mounting assembly located adjacent said container outlet end, said engine mounting assembly including a flanged ring member supported from one of said radially-extending flanges, and a generally frusto-conical member adapted to be affixed at the smaller diameter end thereof to said engine casing, said flanged ring member and said frusto-conical member having opposing annular seating surfaces thereon of substantially concentric spherical curvature in abutment, said seating surfaces being universally relatively movable for positioning said engine in said container so as to minimize unwanted support-induced stress concentrations in said lightweight gas turbine engine casing when supported thereby.

5. A support structure for an aircraft-type gas turbine engine having a lightweight, relatively flexible outer casing and adapted for use in a non-airborne power generation system, said support structure comprising, in combination:
  a generally cylindrical, elongated metal container having an open inlet end and an open outlet end, said container having a forward section and an aft section, and means providing rigidity to said sections including a pair of oppositely extending radial flanges at either end of said aft section and a plurality of hat sections on said forward section;
  radially adjustable support means pivotally connected to one of said hat sections for attaching said engine casing to said container;
  and an engine mounting assembly located adjacent said container outlet end, said mounting assembly including a flanged ring member supported from the rearwardmost radial flange of the container, and a frusto-conical member adapted to be affixed at the smaller diameter end thereof to said engine casing, said flanged ring member and said frusto-conical member having opposing annular matching seating surfaces thereon of spherical curvature, said seating surfaces being in abutment and providing a gas tight seal between said container and the exhaust gas flow of said engine, said surfaces being universally relatively movable to compensate for misalignment and non-concentricity between said container and said engine casing when supported therein, said mounting assembly compensating for increased internal gas pressure loadings by uniformly circumferentially distributing such loadings to said container.

References Cited by the Examiner
UNITED STATES PATENTS

| | | | |
|---|---|---|---|
| 2,779,283 | 1/1957 | Baughman | 244—54 X |
| 2,807,934 | 10/1957 | Purvis et al. | 60—39.31 |
| 2,936,978 | 5/1960 | Lauck | 245—5 |

CLAUDE A. LE ROY, *Primary Examiner.*

J. PETO, *Assistant Examiner.*